(12) United States Patent
Schmidt-Petersen et al.

(10) Patent No.: US 11,499,437 B2
(45) Date of Patent: Nov. 15, 2022

(54) SEALING APPARATUS FOR A TURBOMACHINE, SEAL-CARRIER RING ELEMENT FOR A SEALING APPARATUS, AND TURBOMACHINE

(71) Applicant: MTU Aero Engines AG, Munich (DE)

(72) Inventors: Julia Schmidt-Petersen, Munich (DE); Markus Schlemmer, Mainburg/Sandelzhausen (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/190,984

(22) Filed: Mar. 3, 2021

(65) Prior Publication Data
US 2021/0277791 A1 Sep. 9, 2021

(30) Foreign Application Priority Data
Mar. 6, 2020 (DE) .......................... 102020202862.1

(51) Int. Cl.
| | | |
|---|---|---|
| *F01D 9/04* | (2006.01) | |
| *F01D 11/08* | (2006.01) | |
| *F01D 25/24* | (2006.01) | |

(52) U.S. Cl.
CPC .............. *F01D 9/042* (2013.01); *F01D 11/08* (2013.01); *F01D 25/246* (2013.01); *F05D 2220/30* (2013.01); *F05D 2240/11* (2013.01); *F05D 2240/55* (2013.01)

(58) Field of Classification Search
CPC ........ F01D 25/246; F01D 9/042; F01D 9/044; F01D 9/065; F05D 2240/55; F05D 2260/36
See application file for complete search history.

(56) References Cited

U.S. PATENT DOCUMENTS

| | | |
|---|---|---|
| 4,856,963 A | 8/1989 | Klapproth et al. |
| 6,901,821 B2 | 6/2005 | Torrance et al. |
| 7,172,199 B2 | 2/2007 | Rogers |
| 7,516,962 B2 | 4/2009 | Boeck |
| 8,500,394 B2 | 8/2013 | Major et al. |

(Continued)

FOREIGN PATENT DOCUMENTS

| | | |
|---|---|---|
| DE | 69606392 T2 | 9/2000 |
| DE | 103 20450 A1 | 11/2004 |

(Continued)

*Primary Examiner* — Eldon T Brockman
(74) *Attorney, Agent, or Firm* — Davidson, Davidson & Kappel, LLC

(57) ABSTRACT

A sealing apparatus for a turbomachine, including a stator vane component, which includes an inner shroud element and a flow-directing element connected to the inner shroud element. The sealing apparatus includes a sealing component, which has a seal-carrier ring element coupled to the stator vane component. The seal-carrier ring element includes at least one ring body element and at least one projection, which is connected in one piece to the at least one ring body element, protrudes from the at least one ring body element in the radial direction of the sealing apparatus, and is inserted into at least one opening, which extends through the inner shroud element. Other aspects relate to a seal-carrier ring element for a sealing apparatus, and to a turbomachine which includes at least one sealing apparatus and/or at least one seal-carrier ring element.

20 Claims, 5 Drawing Sheets

(56) References Cited

U.S. PATENT DOCUMENTS

| | | | |
|---|---|---|---|
| 9,631,515 B2 | 4/2017 | Oyarbide et al. | |
| 10,612,399 B2* | 4/2020 | Freeman | F01D 9/041 |
| 10,808,560 B2* | 10/2020 | Sippel | F01D 11/001 |
| 2014/0227080 A1 | 8/2014 | Stiehler et al. | |
| 2015/0010385 A1 | 1/2015 | Oyarbide et al. | |
| 2019/0368360 A1* | 12/2019 | Freeman | F01D 9/041 |
| 2019/0390558 A1* | 12/2019 | Sippel | F01D 9/065 |

FOREIGN PATENT DOCUMENTS

| | | |
|---|---|---|
| DE | 10 2013 011350 A1 | 1/2015 |
| EP | 2824282 A1 | 1/2015 |
| EP | 3121379 A1 | 1/2017 |
| WO | WO9628642 | 9/1996 |

* cited by examiner

SEALING APPARATUS FOR A TURBOMACHINE, SEAL-CARRIER RING ELEMENT FOR A SEALING APPARATUS, AND TURBOMACHINE

This claims the benefit of German Patent Application DE 102020202862.1, filed Mar. 6, 2020 which is hereby incorporated by reference herein.

SPECIFICATION

The present invention relates to a sealing apparatus for a turbomachine having at least one stator vane component, which includes at least one inner shroud element and at least one flow-directing element connected thereto, and having at least one sealing component, which has at least one seal-carrier ring element coupled to the at least one stator vane component. Other aspects of the present invention relate to a seal-carrier ring element for a sealing apparatus, and to a turbomachine.

BACKGROUND

To optimize the efficiency of turbomachines, for example, gas turbines, it is especially useful to minimize leakage flows between a rotating rotor and the stationary sealing apparatus. A leakage gap is sealed in this case between the radially inner, thus in other words in the area between the ends of fixed stator vanes, which are inwardly disposed in the radial direction of the sealing apparatus, and the rotating rotor. The sealing component is secured and thus fixed to the stator vane component by a slide block, which is attached, for example, by a rivet or bolt. A sealing component for sealing the leakage gap between the radially inner ends of the fixed stator vanes and the rotating rotor can also described as an "inner air seal."

SUMMARY OF THE INVENTION

It is an object of the present invention to provide a sealing apparatus, a seal-carrier ring element as well as a turbomachine of the type mentioned at the outset that will be especially low in weight and be able to be manufactured economically.

The present invention provides a sealing apparatus, a seal-carrier ring element as well as a turbomachine.

The present invention provides a sealing apparatus (10) for a turbomachine (100), comprising at least one stator vane component (20), which includes at least one inner shroud element (30) and at least one flow-directing element (40) connected to the at least one inner shroud element (30), and comprising at least one sealing component (50), which has at least one seal-carrier ring element (60) coupled to the at least one stator vane component (20), wherein the at least one seal-carrier ring element (60) includes at least one ring body element (70) and at least one projection (80), which is connected in one piece to the at least one ring body element (70), protrudes from the at least one ring body element (70) in radial direction (R) of the sealing apparatus (10), and is inserted into at least one opening (32) of the at least one stator vane component (20).

A first aspect of the present invention relates to a sealing apparatus for a turbomachine, having at least one stator vane component, which includes at least one inner shroud element and at least one flow-directing element connected thereto, and having at least one sealing component, which has at least one seal-carrier ring element coupled to the at least one stator vane component. The at least one flow-directing element may, in particular be in the form of an airfoil and referred to as a stator vane. The sealing component may also be referred to as an "inner air seal", abbreviated as "IAS." The sealing component may be designed for sealing a leakage gap between the stator vane component and a rotor, in particular moving blades of the rotor of the turbomachine. In this regard, the sealing component may have an abradable layer. The abradable layer may define the leakage gap in the radial direction of the sealing apparatus. Thus, during normal intended use of the sealing apparatus, the abradable layer may be directly contiguous to the leakage gap in the radial direction of the sealing apparatus.

The present invention provides that the at least one seal-carrier ring element include at least at least one ring body element and at least one projection, which is connected in one piece, in particular in a single piece, monolithically and/or integrally to the at least one ring body element and protrudes from the at least one ring body element in the radial direction of the sealing apparatus and is inserted into at least one opening of the at least one stator vane component. This is advantageous since the one-piece connection between the ring body element and the at least one projection requires very few individual parts for installing the sealing apparatus, making it possible for the sealing apparatus to be manufactured very economically. The at least one projection may protrude from the ring body, in particular radially, thus in the radial direction of the sealing apparatus. The projection may also be referred to as a lug. The at least one opening may preferably extend through the at least one inner shroud element. The opening may also be in the form of a pocket, thus, for example, counterbored hole, which may extend, at least in some regions, radially through the stator vane component, in particular through the inner shroud element. An opening or pocket extending through the stator vane component, in particular through the inner shroud, may be produced very economically. The opening may, in particular be referred to as an installation opening. Correspondingly, the pocket may also be referred to as an installation pocket. In the case of the stator vane component, the flow-directing element(s), in particular one or a plurality of stator vane airfoils, and the, in particular common inner shroud element, in particular inner shroud segment, may preferably be mutually connected and/or formed in a single piece, integrally and/or monolithically, for example, cast as a common piece.

The preferably integrally formed stator vane component may, in particular be a stator vane cluster or stator vane cluster segment, which includes one or plurality of stator vanes, for example, exactly one, exactly two, exactly three, exactly four, exactly five, exactly six or exactly seven or more, and form a part or a segment of a stator vane ring or be provided for that purpose.

It is especially preferred that the seal-carrier ring element be free of additional projections disposed next to the projection in the axial direction of the sealing apparatus. Thus, it may be provided that only the at least one projection extends into the at the at least one opening. Therefore, if the seal-carrier ring element has a plurality of projections that are connected to the ring body element, these projections may, in particular be disposed in a series, it being possible to eliminate the need for providing further projections in the axial direction of the sealing apparatus in addition to the projections.

The at least one inner shroud element and the at least one ring body element may preferably be radially braced against one another, in particular directly. This makes it possible to very reliably counteract any tilting between the inner shroud element and the ring body element.

The seal-carrier ring element may also be referred to as a seal carrier ring and feature a plurality of projections. The inner shroud element may have a plurality of openings. In each case, the projections as well as the openings may be disposed in series, in particular circularly, in the circumferential direction of the sealing apparatus. In the context of the present disclosure, the term "circular" may be understood to mean that, together, the projections may form a circle, analogously to a pitch circle. Thus, it may be provided, for example, that the seal-carrier ring element has 20 projections, for example, which, circumferentially, are circularly disposed in series, and of which, each projection may be inserted into one of 20 openings on the inner shroud element, respectively. Thus, one of the projections may be inserted into one of the openings, respectively. In the circumferential direction of the sealing apparatus, a plurality, thus not just the one projection, for example, two or three projections may be inserted correspondingly not only into the one opening, rather, for example, into two or three openings on the inner shroud element. When two or three projections of the seal-carrier ring element are inserted correspondingly into two or three openings on the inner shroud member, it is possible to thereby achieve an especially reliable coupling between the seal-carrier ring element (and thus the sealing component) and the stator vane component.

In an advantageous embodiment of the present invention, at least the sealing component is formed without slide blocks. This is advantageous since the embodiment without slide blocks eliminates the need therefor, making possible a simplified installation of the sealing apparatus. It is conceivable that the at least one projection on the inner shroud element and, additionally or alternatively, the surface areas of the projection facing the flow-directing element have at least a wear-protection layer. This wear protection layer may take the place of the slide blocks. In addition, a simplified installation of the sealing apparatus may be achieved when the stator vane component is also formed without slide blocks. An especially simple installation of the sealing apparatus may be achieved when the entire sealing apparatus is formed without slide blocks.

In another advantageous embodiment of the present invention, the at least one opening leads into at least one cavity of the at least one vane element. This is advantageous since the cavity of the vane element makes it possible to economize on weight, for one thing, and to provide an especially simple communication between the opening and the cavity when the opening is fashioned as a readily producible cutout through the inner shroud element.

Another advantageous embodiment of the present invention provides that the at least one projection be spaced apart in the radial direction of the sealing apparatus from at least one cavity bottom of the at least one cavity. This is advantageous since it makes possible an especially free, in particular collision-free, for example, heating-induced expansion of the projection in the radial direction of the sealing apparatus.

In an advantageous embodiment of the present invention, the seal-carrier ring element includes at least three projections or at least as many projections as there are stator vane components designed as integrally formed stator vane cluster segments, and/or the seal-carrier ring element is spoke-centered by the projections radially within the stator vane components.

In the case of such a spoke-centering, where at least three projections pointing in pairs in different radial directions are inserted into a stator vane component (in each instance, the same or different) and are radially guided in each particular case in an associated opening of a stator vane component, the seal-carrier ring element, which, in particular, is designed as an integral ring or circular ring, is held by the radial guides and centered within a plane perpendicularly to the axis of rotation of the turbomachine, so that, in particular the ring center point is on or in the area of the axis of rotation.

In the case of the spoke centering, in particular each radial guide of the spoke centering is not radially fixed, i.e., in the area of the guide, not secured, for example, radially inwardly, against a displacement in the respective radial direction.

When inserted into an opening of the stator vane component, each of the projections, together with the opening, preferably forms a radial guide in exactly one, specific radial direction, which coincides with the radial direction at the location of the inserted projection. In other words, the projection extends quasi one-dimensionally or linearly in the relevant radial direction and is guided in this radial direction at least on a radial portion completely along the circumferential surface thereof.

In the area of the radial guide, the projection in question is preferably secured against a displacement perpendicularly to the respective radial direction.

At least in portions thereof, the projection(s) may have a constant cross section in the radial direction and/or taper radially outwardly at least in portions thereof.

In some variants of the present invention, the stator vane component does not have any projections that stand out radially inwardly from the inner shroud element thereof, in particular at least no projections for a radial guide and/or fixing elements or guide elements that stand out radially inwardly. This makes possible a comparatively simple design for the stator vane components. Thus, the spoke centering may be provided only by the projections of the seal-carrier ring element, without the need for further projections or guide elements of the stator vane component that stand out radially inwardly.

In some specific embodiments of the present invention, the one or plurality of projections of the seal-carrier ring element extend through the particular inner shroud element and, in particular into a respective stator vane or are provided and designed for that purpose.

In another advantageous embodiment of the present invention, the wall regions of the sealing apparatus bounding at least one opening and the at least one projection form at least an interlocking fit, which prevents a relative movement between the at least one stator vane component and the at least one sealing component in the circumferential direction and/or in the axial direction of the sealing apparatus. This is advantageous since a secure coupling between the stator vane component and the sealing component is hereby made very readily possible. The relative movement between the stator vane component and the sealing component may be very substantially limited when the stator vane component and the sealing component form the interlocking fit, both in the circumferential and in the axial direction. The stator vane component and the sealing component may, in particular be interconnected in a bolt-free, pin-fee and, additionally or alternatively, screw-free manner. In other words, the stator vane component and the sealing component may be interconnected without bolts, pins, and, additionally or alternatively, screws. In particular, the stator vane component and the sealing component may only be interlockingly coupled and thereby interconnected. The wall regions may be formed by the inner shroud element. In other words, the wall regions may be associated with the inner shroud element. The inner shroud element may thus include the wall regions.

In another advantageous embodiment of the present invention, the at least one seal-carrier ring element includes at least one sealing flange element which is connected to the at least one ring body element and, in the axial direction of the sealing apparatus, is spaced apart from the at least one projection. This is advantageous since an exceptional imperviousness to leakage flows may be hereby achieved. The sealing flange element and the ring body element may be interconnected in one piece, in particular. This makes possible an especially economical installation of the sealing apparatus.

In accordance with a specific embodiment, the seal-carrier ring element is designed as an integral, closed ring or includes such a ring. Accordingly, the seal-carrier ring element may be an unsegmented full ring having a one-piece, monolithic design or may include the same.

In another advantageous embodiment of the present invention, the at least one stator vane component includes at least one flange element, which protrudes from the at least one inner shroud element in the radial direction of the sealing apparatus and is inserted into an intermediate space which extends in the axial direction of the sealing apparatus between the at least one sealing flange element and the at least one projection. This is advantageous since an exceptional sealing action against leakage flows may be hereby achieved. Thus, this configuration allows the flange element to engage in the intermediate space between the sealing flange element and the projection, whereby an improved sealing may be achieved, similarly to a labyrinth seal. The inner shroud element may, in particular protrude in the direction of the ring body element.

In another advantageous embodiment of the present invention, the at least one stator vane component includes at least one additional flange element, which protrudes from the at least one inner shroud element in the radial direction of the sealing apparatus and is spaced apart from the at least one flange element in the axial direction of the sealing apparatus, forming at least one gap space. This is advantageous since it makes it possible to even further improve the sealing action against leakage flows. The additional flange element may protrude in the radial direction, in particular in the direction of the least one ring body element. The gap space may, in particular be in the form of an annular gap. The expression "gap space" may thus be understood to be a gap in a gap shape, in particular annular gap shape. The at least one opening may also extend between the flange element and the additional flange element.

An advantageous embodiment of the present invention provides that the at least one projection is inserted into the at least one gap space. This advantageously results in a successive series of sealing flange element, flange element, projection and additional flange element, making possible, on the one hand, an exceptional sealing action against leakage flows and, on the other hand, an especially durable, in particular form-fitting connection between the flow-directing component and the sealing component.

A second aspect of the present invention relates to a seal-carrier ring element for a sealing apparatus in accordance with the first aspect of the present invention. The seal-carrier ring element includes at least one ring body element and at least one projection, which is connected in one piece to the at least one ring body element and protrudes from the at least one ring body element in the radial direction of the sealing apparatus, the at least one projection being designed to be inserted into the at least one opening of the at least one stator vane component of the sealing apparatus and thereby to receive the stator vane component.

A third aspect of the present invention relates to a turbomachine, including at least a sealing apparatus in accordance with the first aspect of the present invention and/or at least one seal-carrier ring element in accordance with the second aspect of the present invention. This turbomachine has an especially low weight and may be manufactured economically.

In an advantageous embodiment of the present invention, the turbomachine is in the form of an aircraft engine. This is advantageous since, due to the low weight thereof, the turbomachine is particularly suited for use as an aircraft engine.

The features presented in the context of the sealing apparatus in accordance with the first aspect of the present invention and the seal-carrier ring element in accordance with the second aspect of the present invention, as well as the advantages thereof apply accordingly to the inventive turbomachine in accordance with the third aspect of the present invention, and vice versa.

Other features of the present invention will become apparent from the claims and the exemplary embodiments. The features and feature combinations mentioned above in the description, as well as the features and feature combinations mentioned below in the exemplary embodiments and/or described in isolation may be used not only in the particular stated combination, but also in other combinations or alone, without departing from the scope of the present invention. Thus, variants of the present invention are also considered to have been included and described herein that are not explicitly described and explained in the exemplary embodiments, but derive from and may be produced by separate combinations of features from the stated variants. In addition, embodiments and combinations of features which, therefore, do not have all of the features of an originally formulated independent claim are also considered to be disclosed. In the drawing,

DETAILED DESCRIPTION

Figure 1:
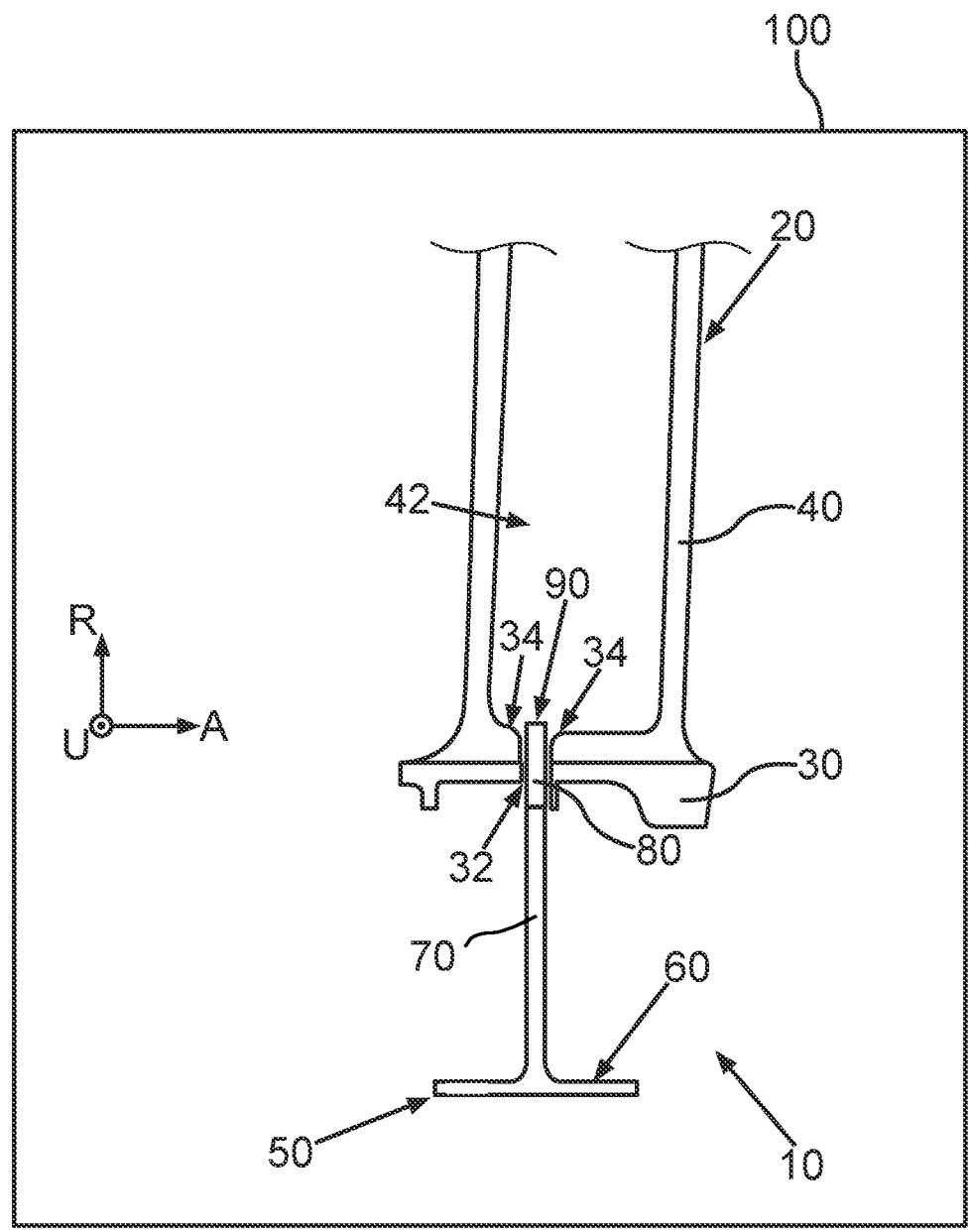
FIG. 1 shows a partial area of a sealing apparatus in a schematic sectional view circumferentially along the sealing apparatus, the sealing apparatus including a stator vane component as well as a sealing component and being configured in a turbomachine shown in a highly abstract form.
Figure 4:
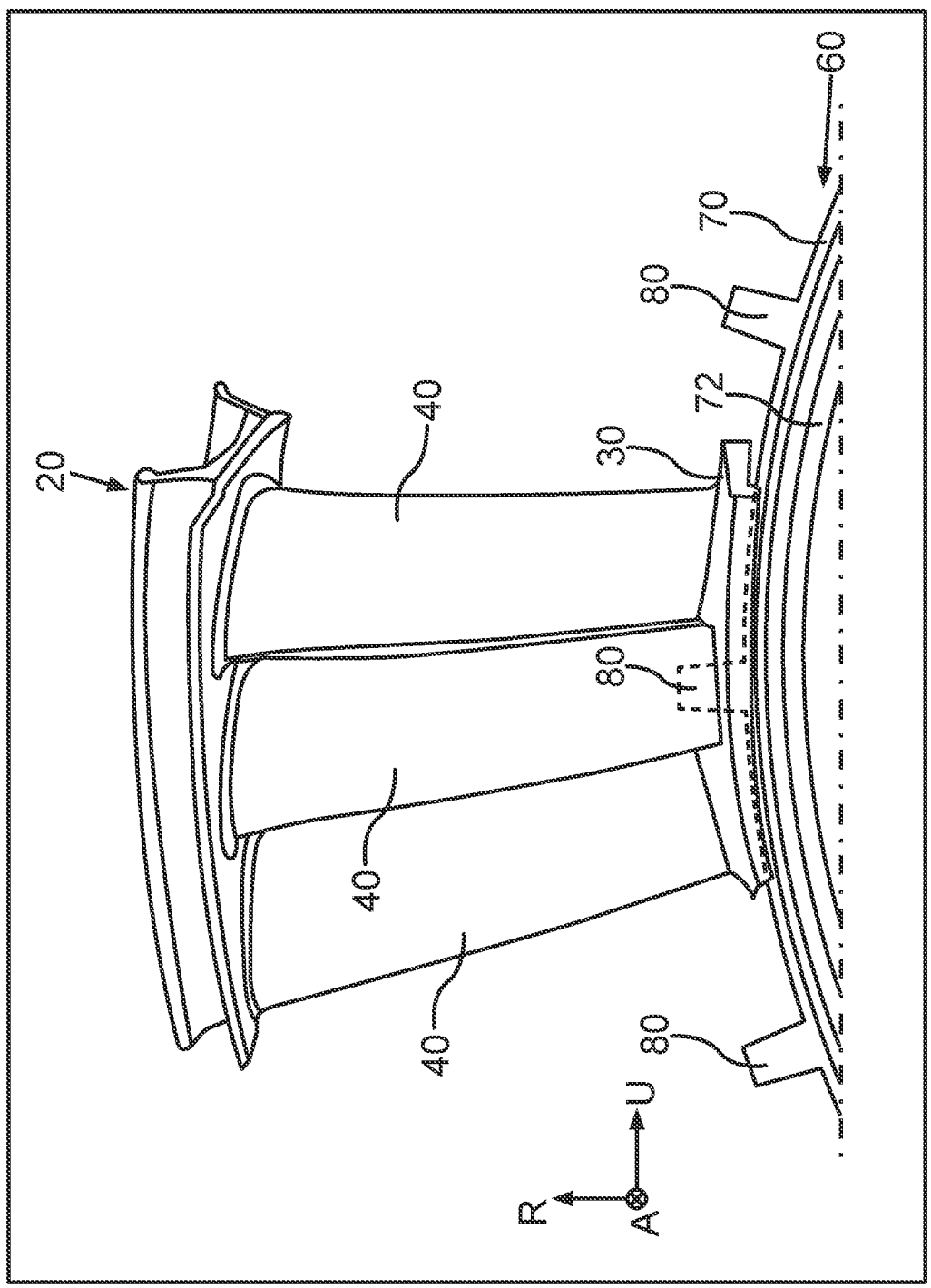
FIG. 4 is a schematic plan view of the sealing apparatus along the axial direction.

In a highly abstract form, FIG. 1 shows a turbomachine 100 designed as an aircraft engine which includes at least one sealing apparatus 10. Sealing apparatus 10 includes a plurality of stator vane components 20 with interior cavities 42, of which only one is indicated in the following. Together, respective stator vane components 20 may form a stator vane ring of turbomachine 100, which is not shown here, however. In the present case, individual stator vane component 20 may form a segment of the stator vane ring, as is exemplarily discernible on the basis of FIG. 4, and may also be referred to as a stator vane ring segment.

Figure 2:
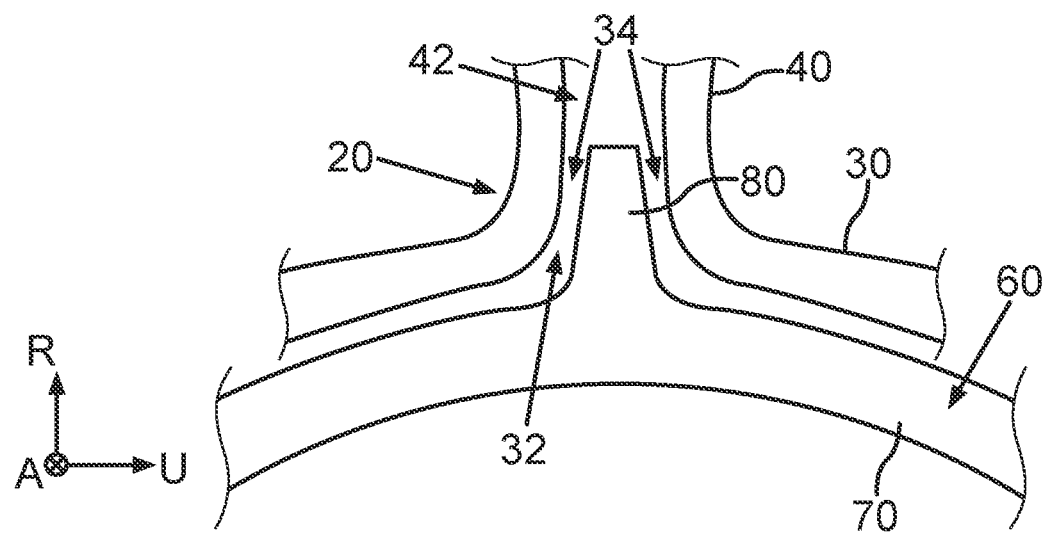
FIG. 2 shows a further sectional, enlarged view of a segment of the sealing apparatus along an axial direction of the sealing apparatus.

Stator vane ring segment 20 includes at least one inner shroud element 30, which is discernible in FIG. 2 in an enlarged view, and at least one flow-directing element 40 in the form of a stator vane airfoil connected to the at least one inner shroud element 30. In addition, stator vane component 20 includes at least one sealing component 50 that is formed without slide blocks, that has at least one seal-carrier ring element 60 coupled to the at least one stator vane component 20. Seal-carrier ring element 60 may, in particular be formed as an unsegmented inner ring.

Figure 3:
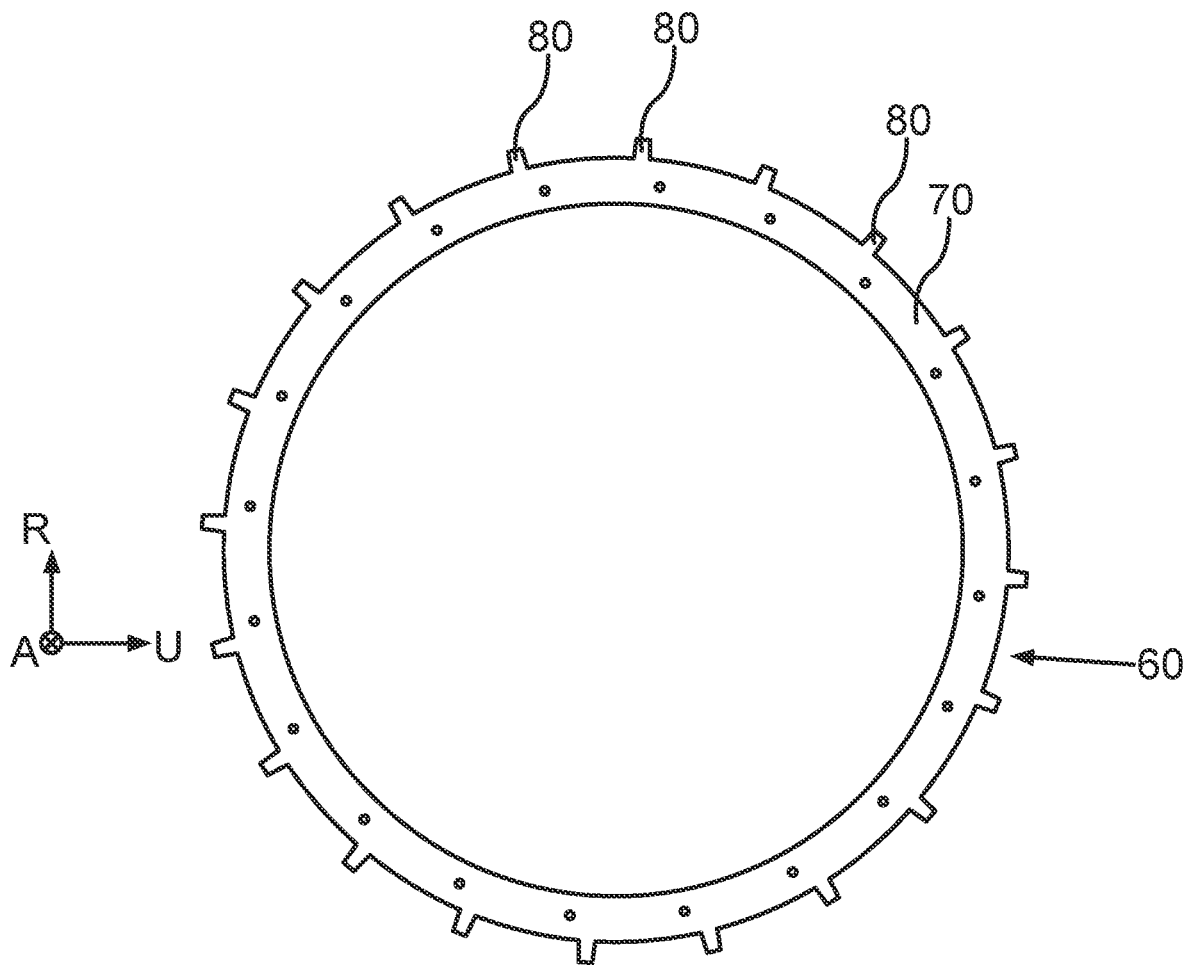
FIG. 3 is a schematic plan view of a seal-carrier ring element of the sealing component along the axial direction of the sealing apparatus, the seal-carrier ring element including a ring body element and a plurality of projections projecting therefrom in the radial direction of the sealing apparatus.
Figure 5:
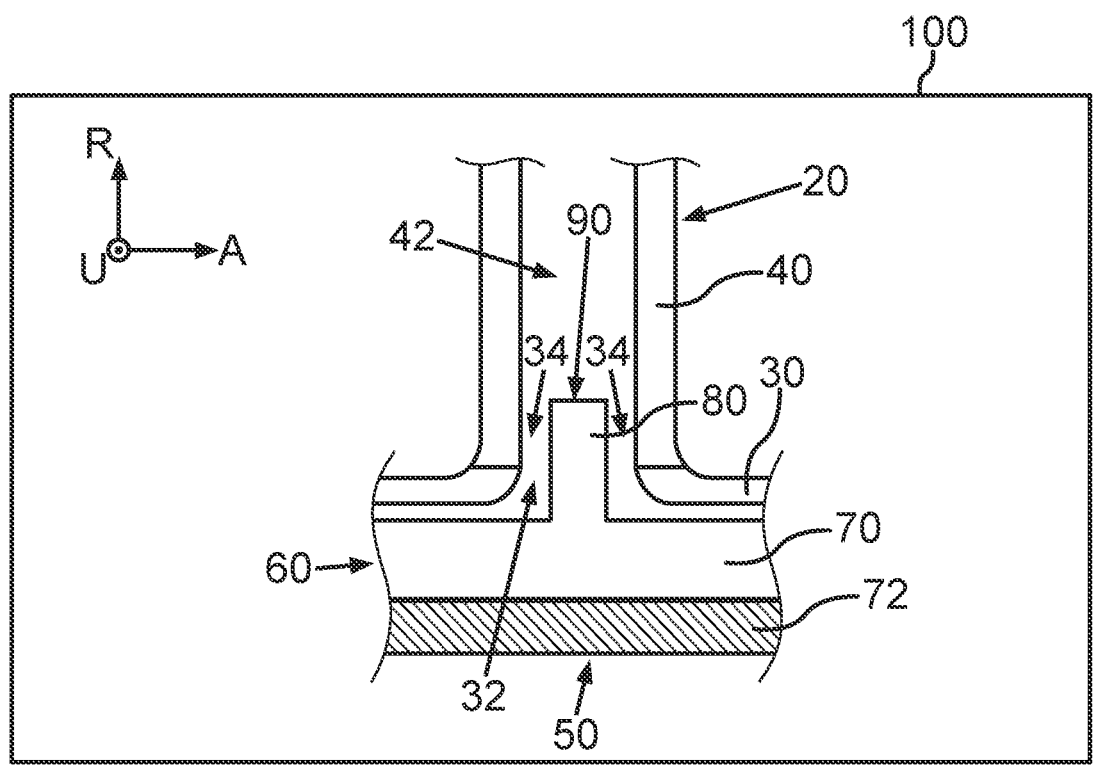
FIG. 5 is another schematic sectional view of the partial area of the sealing apparatus along the circumferential direction, an abradable layer of the sealing component being discernible.
Figure 6:
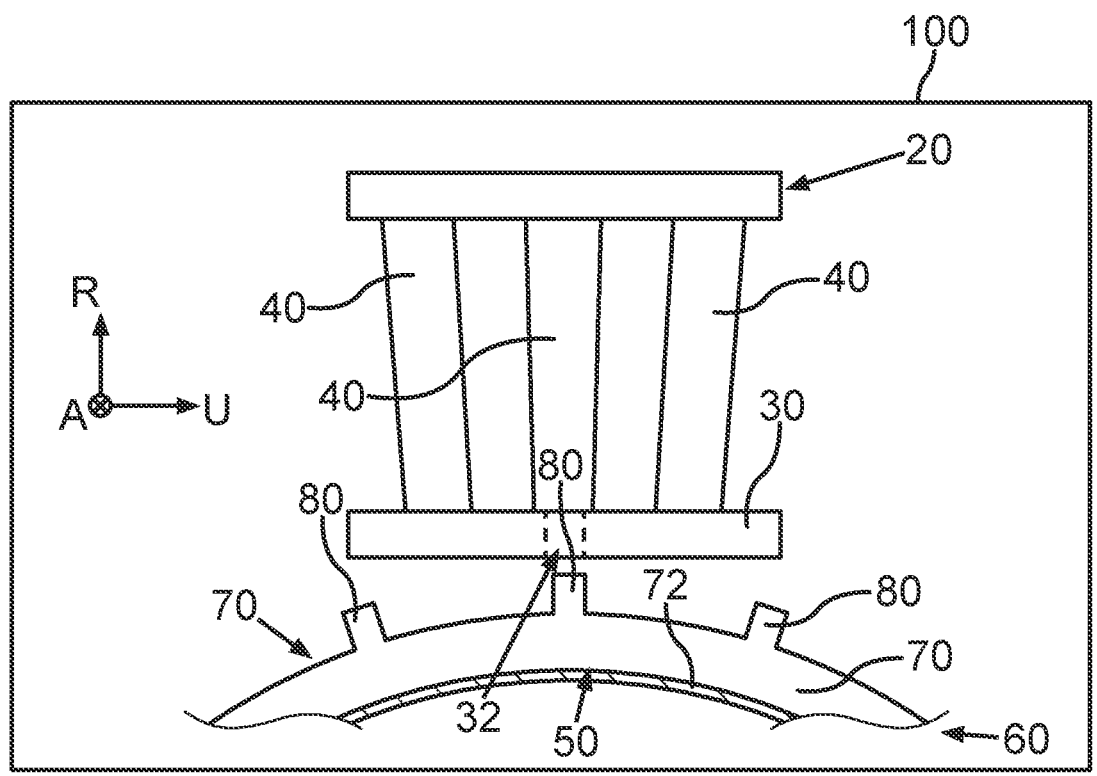
FIG. 6 is a schematic exploded view of the partial area of the sealing apparatus, the stator vane component and the sealing component being separate from one another.

The at least one seal-carrier ring element 60 includes at least one ring body element 70 and projections 80, which are connected in one piece to the at least one ring body element 70, protrude from the at least one ring body element 70 in radial direction R of sealing apparatus 10, and are each inserted into an opening 32 of stator vane component 20, which, in particular may extend through the at least one inner shroud element 30. Thus, in each particular case, one of projections 80, which may also be referred to as lugs, is inserted into one of openings 32, respectively. Both projections 80 as well as openings 32 are uniformly arrayed in circumferential direction U of sealing apparatus 10. Projections 80, as well as the regular array thereof in circumferential direction U of sealing apparatus 10, are very readily discernible both in FIG. 3 as well as in FIG. 4. Projections 80 may preferably be provided with at least one wear protection layer, for example. The wear protection layer may be used for the direct and low-wear bracing of seal-carrier ring element 60 and thus of sealing component 50 against stator vane component 20. FIGS. 5 and 6 each show that sealing component 50 includes at least one abradable layer 72 which is inwardly disposed on ring body element 70 in radial direction R. The abradable layer may preferably have a honeycomb structure and enable "rubbing contact" of a rotor therewith. In particular, the abradable layer may enable a sealing fin on the rotor hub to rub thereinto. Generally, radial direction R not only relates to sealing apparatus 10, but also to annular seal carrier element 60 and turbomachine 100.

Openings 32 lead into respective cavities 42 of the at least one flow-directing element 40. In each particular case, one of openings 32 leads into one of cavities 42, respectively. Openings 32 and cavities 42 may be formed in each case by removal of core material or be introduced into stator vane component 20, preferably by machining.

In radial direction R of sealing apparatus 10, projections 80 are spaced apart from respective cavity bottoms of cavities 42. In radial direction R, the cavity bottoms represent outer boundaries of the respective cavities.

In each case, one of wall regions 34 of sealing apparatus 10 bounding openings 32 and one of projections 80 form an interlocking fit 90, respectively, which at least limits a relative movement between the at least one stator vane component 20 and the at least one sealing component 50 in circumferential direction U and in axial direction A of sealing apparatus 10. Wall regions 34 may preferably be provided with at least one additional wear protection layer. The additional wear protection layer may be used for the direct and low-wear bracing of projections 80 of seal-carrier ring element 60 and thus of sealing component 50 against stator vane component 20. The additional wear protection layer may be provided additionally or alternatively to the wear protection layer (on projections 80). The wear protection layer and the additional wear protection layer may be formed from the same material.

Figure 7:
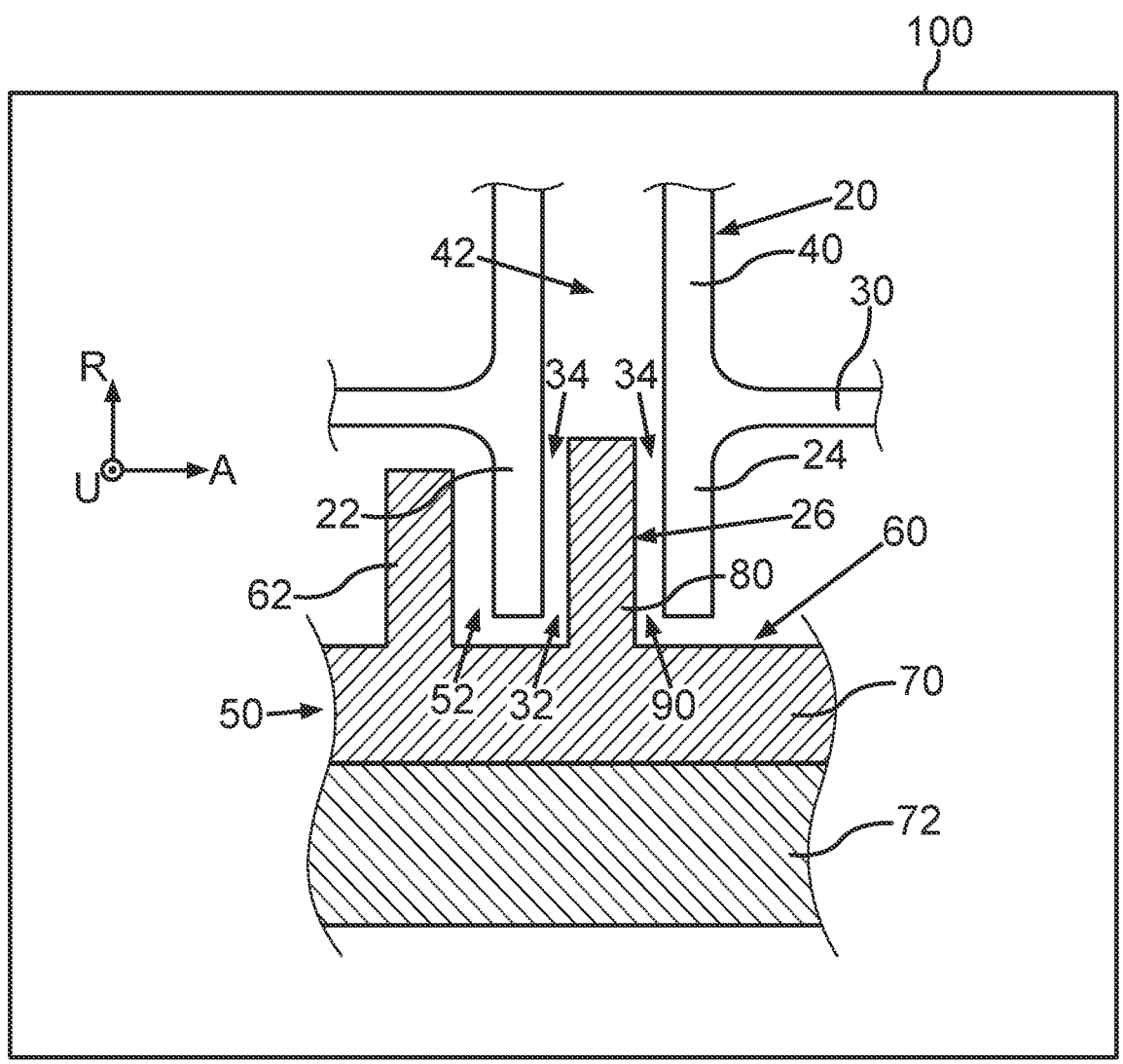
FIG. 7 is a schematic sectional view of a partial area of a variant of the sealing apparatus.

The at least one seal-carrier ring element 60 may additionally include at least one sealing flange element 62, as is discernible in FIG. 7. The at least one sealing flange element 62 is connected to the at least one ring body element 70 and, in axial direction A of sealing apparatus 10, spaced apart from projections 80 which are disposed in series in circumferential direction U of sealing apparatus 10. The at least one stator vane component 20 may additionally include at least one flange element 22, which protrudes from the at least one inner shroud element 30 in radial direction R of sealing apparatus 10 and is inserted into an intermediate space 52, which extends in axial direction A of sealing apparatus 10 between the at least one sealing flange element 62 and the at least one projection 80.

Moreover, the at least one stator vane component 20 shown in FIG. 7 may include at least one additional flange element 24, which protrudes from the at least one inner shroud element 30 in radial direction R of sealing apparatus 10 and is spaced apart from the at least one flange element 22 in axial direction A of sealing apparatus 10, forming at least one gap space 26. Projections 80 are thereby inserted into the at least one gap space 26. Gap space 26 is designed as a space in a gap shape, in particular annular gap shape.

The present sealing apparatus 10 makes it possible to eliminate the need for "inner air seals" known from the related art, where a front flange and a rear flange are produced in a complex process (for example, by turning and grinding) and are usually secured via a slide block using a rivet or lock bolt.

In the case of sealing apparatus 10, projections 80 form a single segment on ring body element 70, projections 80, which are inserted into respective openings 32, effecting the securing between stator vane component 20 and sealing component 50. In the case of sealing apparatus 10, it is possible to eliminate the need for using slide blocks, which may also be referred to as "keys." Moreover, sealing apparatus 10 is lower in weight and is manufactured with less machining outlay than inner air seals known from the related art. For example, the sealing apparatus has a simpler design and fewer parts, it being possible, for example, to eliminate the need for rivets or locking bolts.

LIST OF REFERENCE NUMERALS 10 sealing apparatus
20 stator vane component
22 flange element
24 additional flange element
26 gap space 30 inner shroud element
32 opening
34 wall region
40 flow-directing element
42 cavity
50 sealing component
52 intermediate space
60 seal-carrier ring element
62 sealing flange element
70 ring body element
72 abradable layer
80 projection
90 interlocking fit
100 turbomachine
A axial direction
R radial direction
U circumferential direction

What is claimed is:

1. A sealing apparatus for a turbomachine, the sealing apparatus comprising:
   at least one stator vane component including at least one inner shroud element and at least one flow-directing element connected to the at least one inner shroud element; and
   at least one seal component having at least one seal-carrier ring element coupled to the at least one stator vane component;
   the at least one seal-carrier ring element including at least one ring body element and at least one projection connected in one piece to the at least one ring body element, the at least one projection including a first projection protruding from the at least one ring body element in a radial direction of the sealing apparatus, and being inserted into a first opening of at least one opening of the at least one stator vane component so as to create an interlocking fit between the first projection and the first opening in both the circumferential and the axial direction.

2. The sealing apparatus as recited in claim 1 wherein at least the sealing component is formed without slide blocks.

3. The sealing apparatus as recited in claim 2 wherein the at least one opening leads into at least one cavity of the at least one flow-directing element.

4. The sealing apparatus as recited in claim 3 wherein the at least one projection is spaced apart in the radial direction of the sealing apparatus by at least a cavity bottom of the at least one cavity.

5. The sealing apparatus as recited in claim 1 wherein the at least one projection includes at least three projections.

6. The sealing apparatus as recited in claim 1 wherein the at least one projection includes at least as many projections as a number of the at least one stator vane component, the at least one stator vane component being designed as integrally formed stator vane cluster segments, and the seal-carrier ring element is spoke-centered by the projections radially within the at least one stator vane component.

7. The sealing apparatus as recited in claim 1 wherein wall regions of the sealing apparatus bounding the at least one opening and the at least one projection form at least one interlocking fit preventing a relative movement between the at least one stator vane component and the at least one sealing component in a circumferential direction or in a axial direction of the sealing apparatus.

8. The sealing apparatus as recited in claim 1 wherein the at least one seal-carrier ring element includes at least one sealing flange element connected to the at least one ring body element and, in an axial direction of the sealing apparatus, is spaced apart from the at least one projection, and/or the seal-carrier ring element is designed as an integral, full ring or includes such a ring.

9. The sealing apparatus as recited in claim 8 wherein the at least one stator vane component includes a stator vane flange protruding from the at least one inner shroud element in the radial direction and inserted into an intermediate space extending in an axial direction of the sealing apparatus between the at least one sealing flange element and the at least one projection.

10. The sealing apparatus as recited in claim 9 wherein the at least one stator vane component includes an additional stator flange protruding from the at least one inner shroud element in the radial direction and spaced apart from the stator vane flange in the axial direction forming at least one gap space.

11. The sealing apparatus as recited in claim 10 wherein the at least one projection is inserted into at least one gap space.

12. The sealing apparatus as recited in claim 1 wherein the seal-carrier ring element includes an integral, full ring.

13. A turbomachine comprising at least one sealing apparatus as recited in claim 1.

14. An aircraft engine comprising the turbomachine as recited in claim 13.

15. A turbomachine comprising at least one sealing apparatus as recited in claim 1.

16. An aircraft engine comprising the turbomachine as recited in claim 15.

17. The sealing apparatus as recited in claim 1 wherein the at least one stator vane component has two axially spaced apart wall regions defining the first opening, the first projection being located between the two axially spaced apart wall regions.

18. The sealing apparatus as recited in claim 17 wherein the first projection contacts the wall regions to limit relative motion in the axial direction.

19. The sealing apparatus as recited in claim 17 wherein the at least one stator vane component has two circumferentially spaced apart wall regions further defining the first opening, the first projection being located between the two circumferentially spaced apart wall regions.

20. The sealing apparatus as recited in claim 19 wherein the first projection contacts the two circumferentially spaced wall regions to limit relative motion in the circumferential direction.

* * * * *